(12) United States Patent
Edwards et al.

(10) Patent No.: US 12,165,149 B2
(45) Date of Patent: Dec. 10, 2024

(54) SYSTEMS AND METHODS FOR USER VERIFICATION VIA SHORT-RANGE TRANSCEIVER

(71) Applicant: Capital One Services, LLC, McLean, VA (US)

(72) Inventors: Samuel Patrick Edwards, Richmond, VA (US); Lesley Newton, Richmond, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 255 days.

(21) Appl. No.: 16/991,504

(22) Filed: Aug. 12, 2020

(65) Prior Publication Data
US 2022/0051241 A1 Feb. 17, 2022

(51) Int. Cl.
*G06Q 20/40* (2012.01)
*G06K 7/10* (2006.01)
(Continued)

(52) U.S. Cl.
CPC ....... *G06Q 20/401* (2013.01); *G06K 7/10297* (2013.01); *G06K 19/0723* (2013.01);
(Continued)

(58) Field of Classification Search
CPC . G06K 19/0723; G06K 7/10297; H04W 4/80; G06Q 20/20; G06Q 20/202;
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| AU | 2011207108 | 6/2014 |
| CA | 2859676 | 2/2015 |

(Continued)

OTHER PUBLICATIONS

Ghafoorian, Mahdi et al. An anonymous and secure key agreement protocol for NFC applications using pseudonym. Wireless Networks; New York; vol. 26, Issue 6. Aug. 2020. (Year: 2020).*

(Continued)

*Primary Examiner* — Florian M Zeender
*Assistant Examiner* — Fawaad Haider
(74) *Attorney, Agent, or Firm* — KDW Firm PLLC; Andrew D. Kasnevich

(57) ABSTRACT

Systems, methods, and computer-accessible mediums for user verification through the interaction of a short-range transceiver, such as a contactless card, with a client device are presented. User verification may be provided in the context of reading two types of data from the short-range transceiver, such as a contactless card, using a client device, sending the data to a server, obtaining identifiers from each data type and comparing with stored user identifier data. Matching stored user identifier data to two forms of identification data obtained from a short-range transceiver, such as a contactless card, provides an enhanced ability to verify that the short-range transceiver is being used by an authorized user.

20 Claims, 7 Drawing Sheets

(51) Int. Cl.
  *G06K 19/07* (2006.01)
  *G06Q 20/20* (2012.01)
  *G06Q 20/34* (2012.01)
  *H04W 4/80* (2018.01)

(52) U.S. Cl.
  CPC ............ *G06Q 20/20* (2013.01); *G06Q 20/352* (2013.01); *H04W 4/80* (2018.02)

(58) Field of Classification Search
  CPC .... G06Q 20/40; G06Q 20/204; G06Q 20/322; G06Q 20/401; G06Q 20/352
  USPC .......................................................... 705/16
  See application file for complete search history.

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |
| 5,666,415 | A | 9/1997 | Kaufman |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Mamdani et al. |
| 8,005,426 | B2 | 8/2011 | Huomo et al. |
| 8,010,405 | B1 | 8/2011 | Bortolin et al. |
| RE42,762 | E | 9/2011 | Shin |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |

(56) References Cited

U.S. PATENT DOCUMENTS

| | | |
|---|---|---|
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,524,499 B2 | 12/2016 | Granbery |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,818,098 B2 | 11/2017 | Royyuru et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |

(56) References Cited

U.S. PATENT DOCUMENTS

| | | |
|---|---|---|
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2009/0307142 A1 | 12/2009 | Mardikar |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0010930 A1 | 1/2012 | Langdon et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150687 A1 | 6/2012 | Hart |
| 2012/0150737 A1 | 6/2012 | Rottink |
| 2012/0166337 A1 | 6/2012 | Park et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |

(56) References Cited

U.S. PATENT DOCUMENTS

| | | |
|---|---|---|
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365370 A1 | 12/2014 | Huang et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0033289 A1 | 1/2015 | Caceres et al. |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0220932 A1 | 8/2015 | Mardikar et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0339659 A1 | 11/2015 | Ballesteros |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0132881 A1 | 5/2016 | Lee et al. |
| 2016/0148193 A1 | 5/2016 | Kelley et al. |
| 2016/0196556 A1 | 7/2016 | Tamboly et al. |
| 2016/0224984 A1 | 8/2016 | Mardikar et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0324752 A1 * | 11/2017 | Todasco ............... H04L 63/123 |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0193416 A1 | 6/2020 | Rule et al. |

FOREIGN PATENT DOCUMENTS

| | | | |
|---|---|---|---|
| CA | 3010336 | 7/2017 | |
| CN | 101192295 | 6/2008 | |
| CN | 103023643 | 4/2013 | |
| CN | 103417202 | 12/2013 | |
| CN | 105122283 | 12/2015 | |
| EP | 1 085 424 | 3/2001 | |
| EP | 1 223 565 | 7/2002 | |
| EP | 1 265 186 | 12/2002 | |
| EP | 1 783 919 | 5/2007 | |
| EP | 2 852 070 | 1/2009 | |
| EP | 2 139 196 | 12/2009 | |
| EP | 1 469 419 | 2/2012 | |
| EP | 2885753 | 1/2016 | |
| EP | 3582166 A1 * | 12/2019 | ......... G06Q 20/3278 |
| GB | 2 457 221 | 8/2009 | |
| GB | 2 516 861 | 2/2015 | |
| GB | 2 551 907 | 1/2018 | |
| KR | 20130017507 | 2/2013 | |
| KR | 101508320 | 4/2015 | |
| KR | 20160145962 | 12/2016 | |
| WO | WO 00/49586 | 8/2000 | |
| WO | WO 2006070189 | 7/2006 | |
| WO | WO 2008055170 | 5/2008 | |
| WO | WO 2009025605 | 2/2009 | |
| WO | WO 2010049252 | 5/2010 | |
| WO | WO 2010138613 | 12/2010 | |
| WO | WO 2011112158 | 9/2011 | |
| WO | WO 2012001624 | 1/2012 | |
| WO | WO 2013039395 | 3/2013 | |
| WO | WO 2013155562 | 10/2013 | |
| WO | WO 2013192358 | 12/2013 | |
| WO | WO 2014043278 | 3/2014 | |
| WO | WO 2014170741 | 10/2014 | |
| WO | WO 2015179649 | 11/2015 | |
| WO | WO 2015183818 | 12/2015 | |
| WO | WO 2016097718 | 6/2016 | |
| WO | WO 2016160816 | 10/2016 | |
| WO | WO 2016168394 | 10/2016 | |
| WO | WO 2017042375 | 3/2017 | |

(56) References Cited

FOREIGN PATENT DOCUMENTS

| | | |
|---|---|---|
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

De Bruin, Rossouw. A Wallet-Less Mobile Payment System Using near Field Communication (NFC). University of Johannesburg (South Africa) ProQuest Dissertations Publishing, 2014. (Year: 2014).*

Morrison, Matthew A. Theory, Synthesis, and Application of Adiabatic and Reversible Logic Circuits For Security Application. University of South Florida ProQuest Dissertations & Theses, 2014. 3617366. (Year: 2014).*

International Search Report and the Written Opinion of the International Searching Authority issued in related PCT Application No. PCT/US2021/045145, mailed Oct. 18, 2021.

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on 2019-03-25]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Ma. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

(56) References Cited

OTHER PUBLICATIONS

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Notification Concerning Transmittal of International Preliminary Report on Patentability from related PCT Application No. PCT/US2021/045145, mailed Feb. 23, 2023.

* cited by examiner

SYSTEMS AND METHODS FOR USER VERIFICATION VIA SHORT-RANGE TRANSCEIVER

FIELD OF THE DISCLOSURE

The present disclosure relates generally to user verification and, more specifically, to exemplary systems, methods, and computer-accessible mediums for verifying a user's short-range transceiver through the interaction of the short-range transceiver with a client device.

BACKGROUND

The development of electronic commerce has led to the convenience of consumers and businesses alike. Transactions may be conducted between and among parties from virtually any location and at any time. Use of cards such as credit and debit cards has enhanced the ability to conduct transactions over networks, as consumers may engage in purchase transactions, or conduct other business, merely by providing credentials including a name, a card number, and other data such as, for example, a card expiration date, a card security code, or a billing zip code.

But the increasing use of cards has also resulted in increased risk of fraud or theft. When parties are remotely located, it is more difficult to verify a user's identity or to verify that the user is in possession of the card being used for a transaction. Further, much of the data required for a transaction using a card is typically printed on the card and/or contained in a magnetic stripe on the card, making it easier for malevolent parties to misappropriate and misuse the credentials of another to carry out fraud or theft.

These and other deficiencies exist. Thus, it may be beneficial to provide exemplary systems, methods, and computer-accessible mediums which allow for verification of cards being used for transactions, to overcome at least some of the deficiencies described herein.

SUMMARY

Aspects of the disclosed technology include systems, methods, and computer-accessible mediums for user verification through the interaction of user's short-range transceiver, such as a contactless card, with a client device. User verification may be provided in the context of reading two types of data from the short-range transceiver, such as a contactless card, using a client device such that identifiers and other information may be obtained from each data type and compared with stored information, including stored user identifier data. Matching stored user identifier data to two forms of identification data obtained from a short-range transceiver, such as a contactless card, provides an enhanced ability to verify that the short-range transceiver is being used by an authorized user.

Embodiments of the present disclosure provide a card verification system, comprising: a database storing user identifier information for a plurality of contactless cards; a contactless card comprising a processor and a memory, the memory storing first data of a first type, second data of a second type, a first applet configured to provide the first type data, and a second applet configured to provide the second type data, wherein the contactless card is associated with a user; and a server configured to communicate over a network with the contactless card and the database; wherein, after entry into a short-range communication field, the contactless card is configured to transmit the first type data and the second type data to the server, and wherein, after receipt of the first type data and the second type data, the server is configured to: determine a first user identifier based on the first type data, determine a second user identifier based on the second type data, determine whether the first user identifier and the second user identifier both correspond to the contactless card associated with the user, and transmit a card verification message.

Embodiments of the present disclosure provide a method for card verification, comprising: establishing a database storing user identifier information for a plurality of contactless cards; receiving, via a network, a card verification request to verify a contactless card, the card verification request generated in response to entry by the contactless card into a short-range communication field, the card verification request accompanied by first type data read from the contactless card and by second type data read from the contactless card, wherein the contactless card is associated with a user; determining a first user identifier based on the first type data; determining a second user identifier based on the second type data; determining whether the first user identifier and the second user identifier both correspond to the contactless card associated with the user; and transmitting, via the network, a card verification message.

Embodiments of the present disclosure provide a method for card verification, comprising: establishing a database storing user identifier information for a plurality of contactless cards; providing a contactless card configured for data communication via near field communication (NFC), the contactless card comprising a processor and a memory, the memory storing NFC data exchange format (NDEF) data, Europay Mastercard Visa (EMV) data, a first applet configured to provide the NDEF data responsive to an NDEF read request, and a second applet configured to provide the EMV data responsive to an EMV read request, wherein the contactless card is associated with a user; and providing a server in communication with the contactless card via a network, the server configured to receive the NDEF data and the EMV data and transmit a card verification message, the card verification message based on determining whether a first user identifier associated with the NDEF data and a second user identifier associated with the EMV data both correspond to the contactless card associated with the user.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for user verification through the interaction of a short-range transceiver, such as a contactless card, with a client device. User verification may be provided in the context of reading two types of data from the short-range transceiver, such as a contactless card, using a client device, sending the data to a server, obtaining identifiers from each data type and comparing with stored user identifier data. Benefits of the disclosed technology may include improved user verification, since two identifiers are used to verify that the short-range transceiver (e.g., contactless card) corresponds to the user, improved data security, and improved user experience.

Figure 1A:
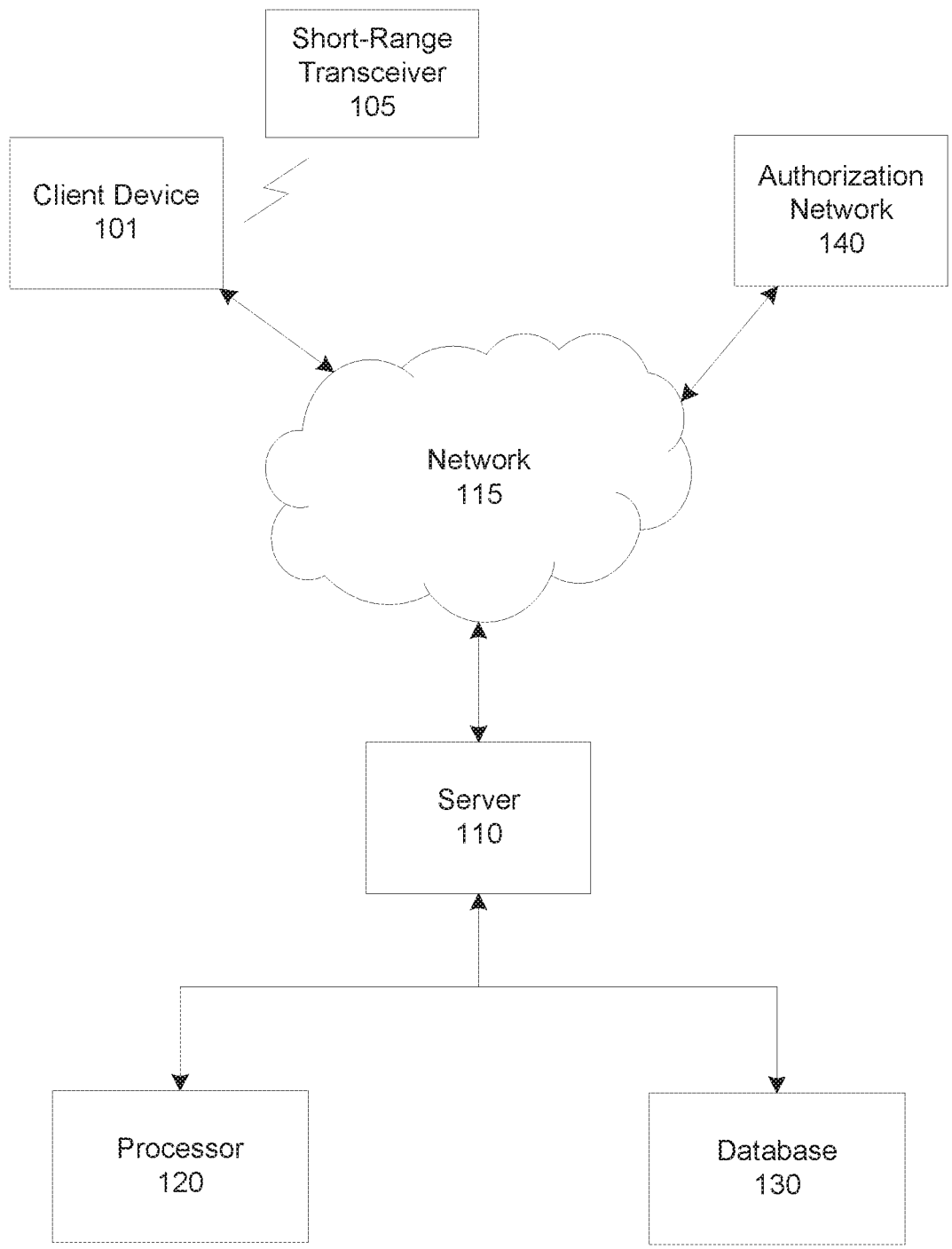
FIG. 1A is a diagram of a user verification system according to one or more example embodiments.

FIG. 1A shows a diagram illustrating a user verification system 100 according to one or more example embodiments. As discussed further below, system 100 may include client device 101, short-range transceiver 105, server 110, processor 120 and database 130. Client device 101 may communicate with server 110 via network 115. Server 110 and/or client device 101 may also communicate with an authorization network 140. Although FIG. 1 illustrates certain components connected in certain ways, system 100 may include additional or multiple components connected in various ways.

System 100 may include one or more client devices, such as client device 101, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, contactless card, a smart card, or other device. Client device 101 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some embodiments, client device 101 may be a point of sale (POS) device associated with a POS system. Additional features that may be included in a client device, such as client device 101, are further described below with reference to FIG. 2.

System 100 may include one or more short-range transceivers, such as short-range transceiver 105. Short-range transceiver 105 may be in wireless communication with a client device, such as client device 101, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, short-range transceiver 105 may be the same or similar as client device 101. Additional features that may be included in a short-range transceiver, such as such as short-range transceiver 105, are further described below with reference to FIG. 3. It is understood that, in embodiments where the short-range transceiver 105 is a contactless card, the present disclosure is not limited to a particular type of contactless card. Rather, the present disclosure includes any type of contactless card, including payment cards (e.g., credit cards, debit cards, gift cards), identity cards (e.g., identification cards, driver's licenses, Social Security cards, membership cards), and travel cards (e.g., passports, tickets, vouchers).

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more users and one or more accounts. Data relating to a user may include one or more user identifiers (which may include one or more card identifiers), and one or more user keys, and may be maintained or organized in one or more accounts. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include information and data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101, and/or with authorization network 140, via one or more networks, such as network 115. Network 115 may include one or more of a wireless network, a wired network or any combination of wireless network and wired network, and may be configured to connect client device 101 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some example embodiments, server 110 may access records, including records in database 130, to determine a method or methods for communicating with client device 101. The communication method may include an actionable push notification, or other appropriate communication techniques, with an application stored on client device 101. Other communication methods may include a text message or an e-mail, or other messaging techniques appropriate in a network-based client/server configuration. Messages or requests by client device 101 may be communicated to server 110 via an application on the client device, or may be sent by a text message or an e-mail, or other messaging techniques appropriate in a network-based client/server configuration. Communications originating with client device 101 may be sent to server 110 using the same communications method as communications originating with server 110, or via a different communications method.

In some example embodiments, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client device 101, short-range transceiver 105, server 110, network 115, and/or database 130, or other computer hardware arrangement.

In some example embodiments, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Authorization network 140 may include one or more parties that may be in the chain of communication for a transaction authorization request that is sent upon a user's attempt to use an account-linked card for a transaction. Such parties may include a merchant or processing bank (such as, e.g., a bank associated with the point of sale merchant), credit card company or association (such as, e.g., Visa, MasterCard, American Express, etc.), card issuer (e.g., bank issuing the credit card to the user). A transaction request initiated at point of sale device, or via a server, may be transmitted with accompanying card and/or account information for processing to authorization network 140 for authorization of the transaction. A transaction request may be authorized, or rejected, or subject of other status, and the result may be transmitted back to the requesting POS device or server.

Figure 1B:
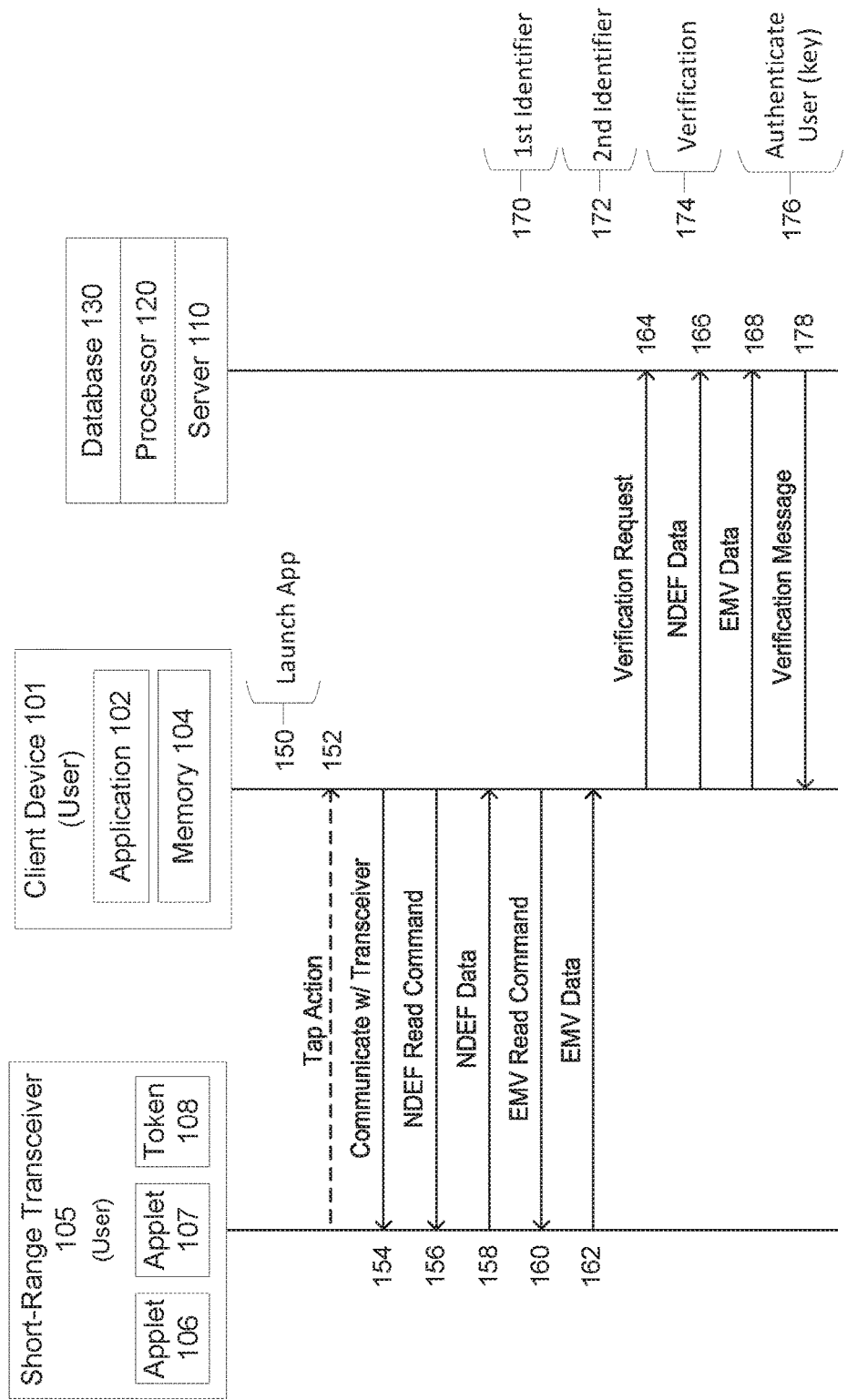
FIG. 1B is a diagram illustrating a sequence for providing user verification according to one or more example embodiments.

FIG. 1B shows a diagram illustrating a sequence for providing user verification according to one or more example embodiments, FIG. 1B references similar components of example embodiment system 100 as illustrated in FIG. 1A. Client device 101 may be associated with a user. Client device 101 may include application 102, which may include instructions for execution by client device 101, and memory 104. Client device 101 may include features further described below with reference to FIG. 2. Application 102 may be configured to provide a user interface for the user when using client device 101. Application 102 may be configured to communicate, via client device 101, with other client devices, with short-range transceiver 105, and with server 110. Application 102 may be configured to receive requests and send messages as described herein with reference to client device 101. User information, including identifiers and/or keys, may be stored in database 130.

Short-range transceiver 105 may be associated with a user, and may be unique to the user and/or to a specific user account. Short-range transceiver 105 may include, for example, a contactless card, and may include features further described below with reference to FIG. 3. Short-range transceiver 105 may have memory storing an applet 106, an applet 107 and/or a token 108. Token 108 may be associated with the user.

A token may be used to increase security through token authorization. Server 110 may send a validation request to a client device, such as client device 101, receive responsive information from the client device, and if validated, send a validation token back to the client device. The validation token may be based on a pre-determined token, or may be a dynamic token based on an algorithm that can be secret and known only to server 110 and the client device; the algorithm may include live parameters independently verifiable by the participants, such as the temperature at a particular location or the time. The token may be used to verify the identity of the user. The validation request and/or validation token may be based on token 108 stored on short-range transceiver 105.

At label 150, the user may launch application 102 running on client device 101. In some embodiments, application 102 may be launched after entry of short-range transceiver 105 into a short-range communication field of client device 101, such as, e.g., in response to a tap action between short-range transceiver 105 and client device 101. Application 102 may require a sign-in or login process, which may be accomplished via, e.g., entering a username and password, or scanning a biometric image such as a fingerprint scan, retina scan, facial scan, etc. In some example embodiments, application 102 may display an instruction on client device 101 prompting the user to initiate a tap action between short-range transceiver 105 and client device 101. As used herein, a tap action may include tapping short-range transceiver 105 against client device 101 (or vice-versa). For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa) such that short-range transceiver 105 enters a short-range communication field of client device 101. An action taken in response to a tap action between short-range transceiver 105 and client device 101 may include any responsive action that is initiated upon or after entry of short-range transceiver 105 into the short-range communication field of client device 101.

At label 152, there may be a first tap action between short-range transceiver 105 and client device 101. The first tap action may be in response to a prompt displayed on client device 101 and/or in response to a verification request (not shown) from processor 120 (e.g., via server 110). In some embodiments, a prompt displayed on client device 101 may be displayed in response to a verification request (not shown) from processor 120 (e.g., via server 110).

At label 154, application 102 may communicate (via client device 101) with short-range transceiver 105 (e.g., after short-range transceiver 105 is brought near client device 101). Communication between application 102 and short-range transceiver 105 may involve short-range transceiver 105 (such as, e.g., a contactless card) being sufficiently close to a card reader (not shown) of the client device 101 to enable NFC data transfer between application 102 and short-range transceiver 105, and may occur in response to a tap action between short-range transceiver 105 and client device 101 (such as, e.g., the tap action at label 152). The communication may include exchange of data or commands to establish a communication session between application 102 and short-range transceiver 105. The exchange of data may include transfer or exchange of one or more keys or tokens, which may be preexisting keys or generated as session keys, and/or may include token 108. In some example embodiments, the communication may occur upon entry of short-range transceiver 105 into a short-range communication field of client device 101 prior to a tap action between short-range transceiver 105 and client device 101.

At label 156, application 102 may transmit (via client device 101) to short-range transceiver 105 a first data read command to read data of a first type from short-range transceiver 105. If the short-range communication field is NFC, the first data read command may be a NFC data exchange format (NDEF) command to read NDEF data. In some embodiments, transmitting the first data read command by client device 101 may occur in response to a tap action between short-range transceiver 105 and client device 101 (such as, e.g., the tap action at label 152).

At label 158, short-range transceiver 105 may transmit the requested first type data to application 102 (via client device 101). Transmission of the requested first type data may be responsive to the first data read command (label 156). Applet 106 may execute the read command and read the first type data from memory on short-range transceiver 105 for transmission to client device 101. The first type data may include a first identifier. The first identifier may be associated with the user and/or with short-range transceiver 105. The first identifier may be unique to the user, and may be unique to a specific user account and/or to a specific short-range transceiver. If the first data read command is a NDEF read command, the first type data read and transmitted may be NDEF data. The NDEF data may be, or may include, a NDEF message, and may include a data block of N characters; in some embodiments the data block may be 64 characters.

At label 160, application 102 may transmit (via client device 101) to short-range transceiver 105 a second data read command to read data of a second type from short-range transceiver 105. The second data read command may be a command to read EMV data (i.e. data formatted according to the Europay Mastercard Visa (EMV) standard). Typically, EMV data is organized according to the application protocol data unit (APDU) structure, which includes standard commands to access EMV data. Commands to read EMV data from a contactless card may correspond to commands that may be issued by point-of-sale (POS) devices or payment systems via a smart card reader or contactless card reader. In some embodiments, transmitting the second data read command by client device 101 may occur in response to a tap action between short-range transceiver 105 and client device 101 (such as, e.g., the tap action at label 152, or a second tap action, not shown, between short-range transceiver 105 and client device 101). The second tap action may be in response to a prompt displayed on client device 101. In some embodiments, the second tap action may be of a different motion than the first tap action of label 152. In some embodiments, client device 101 may distinguish between the motion or card position of the first tap action and the motion or card position of the second tap action and issue a read command for a data type corresponding to the particular motion or card position of the tap action. The second data read command can comprise one or more commands including multiple APDUs as necessary.

At label 162, short-range transceiver 105 may transmit the requested second type data to application 102 (via client device 101). Transmission of the requested second type data may be responsive to the second data read command (label 160). Applet 107 may execute the read command and read the second type data from memory on short-range transceiver 105 for transmission to client device 101. The second type data may include a second identifier. The second identifier may be associated with the user and/or with short-range transceiver 105. The second identifier may be unique to the user, and may be unique to a specific user account and/or to a specific short-range transceiver. If the second data read command is an EMV read command (it may be understood that, according to the APDU standard, an EMV read command may involve multiple APDU commands), the second data read and transmitted may be EMV data. EMV data may include a cryptogram generated by applet 107 using the card number, a key on the card and/or a counter stored on the card.

In some embodiments, short-range transceiver 105 may transmit user token 108 to client device 101. In some embodiments, token 108 may be included with the first type data and/or the second type data sent from short-range transceiver 105 to client device 101. Token 108 may include a user identifier, which may be the first identifier or the second identifier described above. In some embodiments, user token 108 may include a key associated with the user; the key may be a preexisting key or generated as a session key. In some embodiments, the sending of user token 108 to application 102 may occur after entry of short-range transceiver 105 into a short-range communication field of client device 101 such as, e.g., in response to a tap action between short-range transceiver 105 and client device 101 (such as, e.g., the tap action at label 152). In addition to user token 108, short-range transceiver may send other data to application 102, including data such as a counter, public key, other information, etc. (or these data items may be included in user token 108).

At label 164, application 102 may transmit (via client device 101) a verification request to server 110, requesting verification of the short-range transceiver 105 associated with the user. This may occur after entry of short-range transceiver 105 into a short-range communication field of client device 101 such as, e.g., in response to a tap action between short-range transceiver 105 and client device 101 (e.g., the tap action at label 152). The tap action can comprise a tap, a swipe, a wave, another gesture in which the short-range transceiver 105 enters a short-range communication field of the client device 101, or any combination thereof. In some embodiments, the verification request from application 102 may be responsive to a verification request from processor 120 (as described above with reference to label 152). In some embodiments, the verification request can comprise NDEF and EMV data.

At label 166, application 102 may transmit (via client device 101) first type data to server 110, which may include some or all of the first type data received from short-range transceiver 105 (label 158). The first type data may include the first identifier, may include token 108, and may be NDEF data.

At label 168, application 102 may transmit (via client device 101) second type data to server 110, which may include some or all of the second type data received from short-range transceiver 105 (label 162). The second type data may include the second identifier, may include token 108, and may be EMV data.

At label 170, processor 120 may receive (e.g. via server 110) the first type data, which may be NDEF data. Processor 120 may obtain the first identifier from the first type data.

At label 172, processor 120 may receive (e.g. via server 110) the second type data, which may be EMV data. Processor 120 may obtain the second identifier from the second type data.

The order of read commands sent and type data transmitted/received is not critical. Thus, a command to read second type data may precede a command to read first type data, and the respective transmissions of second type data responsive to a command to read second type data may precede the respective transmissions of first type data responsive to a command to read first type data. For example, where the two data types are NDEF data and EMV data, respectively, an EMV read command may precede a NDEF read command, and the responsive transmission of EMV data may precede the responsive transmission of NDEF data.

At label 174, processor 120 may carry out a verification process based on the first identifier obtained from the first type data, and the second identifier obtained from the second type data. The verification process may include using the first identifier to look up user information in database 130 and using the second identifier to look up user information in database 130. The verification process may include comparing the user information obtained from the first identifier lookup to the user information obtained from the second identifier lookup to determine if the user information from each lookup corresponds to the same user and/or corresponds to the same short-range transceiver. In some embodiments, the verification process may include comparing the user information obtained from the first identifier lookup to the user information obtained from the second identifier lookup to determine if the user information from each lookup corresponds to the same short-range transceiver associated with the user. In some embodiments, if the second type data is EMV data, the verification process may include identifying a counter value used in generating a cryptogram in the EMV data and determining whether the counter value is within an acceptable range.

In some embodiments, at label 176, if token 108 includes a user key associated with the user, processor 120 may use the user key to authenticate the user as the user associated with short-range transceiver 105. Database 130 may store a copy of the user key, or a key associated with the user that may be used to generate a copy of the user key. Generating a copy of the user key based on the key associated with the user may include using a counter or other data derived or otherwise maintained in synchronization between processor 120, client device 101 and/or short-range transceiver 105.

At label 178, based on the results of the verification process (label 174) and any authentication process (label 176), processor 120 may send a verification message to application 102 (via client device 101) confirming that the user and/or short-range transceiver 105 are verified. Based on the verification, the user may proceed to carry out further actions, such as, for example, a purchase, deposit or withdrawal transaction. The verification message may include, or be accompanied by, additional data that may be used by the user or client device in carrying out any such further actions. Such additional data may include a token or key.

In an embodiment, processor 120 may instead send a denial notification (not shown) to application 102 (via client device 101), indicating that the user or the short-range transceiver has not been verified. A denial notification may include, or be accompanied by, additional data that may indicate a reason for the failure.

In some embodiments, application 102 may only send data of one type (such as, for example, first type data but not second type data, or vice-versa) or data of an unknown type. This may occur, for example, if short-range transceiver 105 moves out of range of the short-range communication field, or if short-range transceiver 105 is incapable of providing data of one or both types. In such cases, processor 120 may send a message (not shown) to application 102 requesting that the user try again and/or try again with a different short-range transceiver (e.g., a different contactless card). In some embodiments, application 102 may detect and alert the user to a potential problem (such as, e.g., receiving only first type data but not second type data, or vice-versa) without sending data to server 110 or receiving a message from processor 120.

Figure 2:
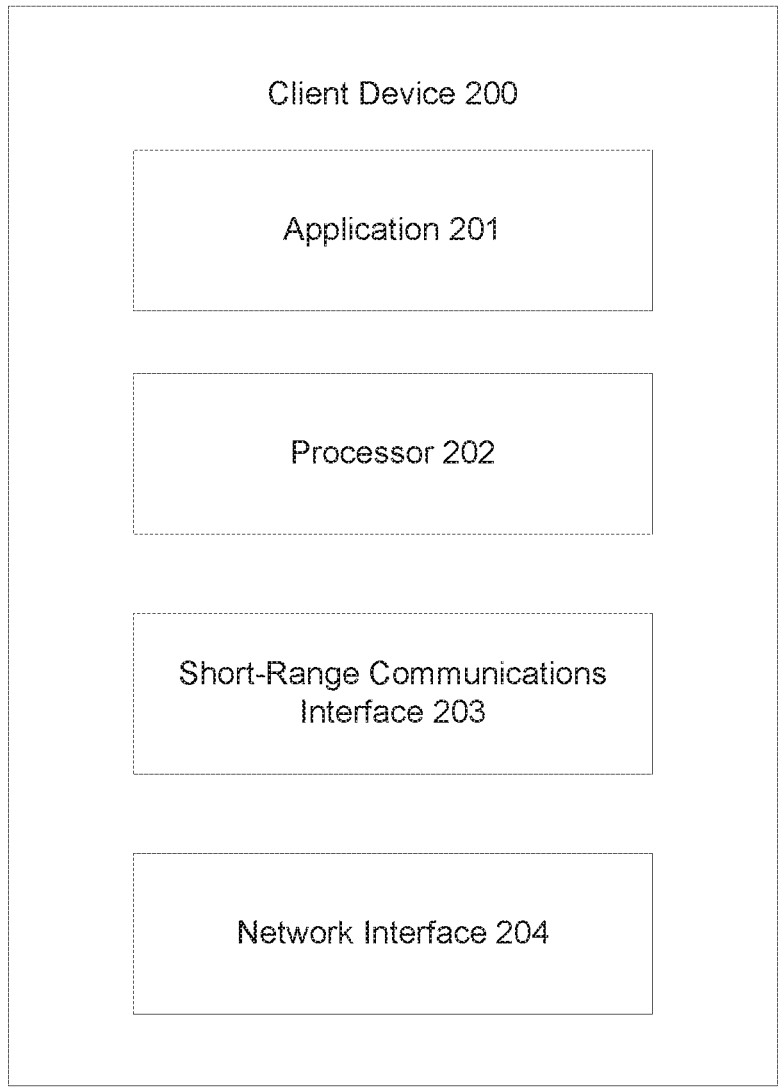
FIG. 2 illustrates components of a client device used in a user verification system according to one or more example embodiments.

FIG. 2 illustrates components of a client device 200 used in a user verification system according to one or more example embodiments. Client device 200 may be one or more of client devices 101, described above with reference to FIGS. 1A-1B. Client device 200 may include one or more applications 201, one or more processors 202, a short-range communications interface 203, a network interface 204, and memory (not shown). Application 201 may include a software application or executable program code to be executed on processor 202 and configured to carry out features described herein for any client devices, such as client device 101, and/or any of the features described herein with reference to application 102. Application 201 may be configured, for example, to transmit and/or receive data with other devices via client device 101, such as, e.g., via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may include a read-only memory, write-once read-multiple memory and/or read/write memory, e.g., RAM, ROM, and/or EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, a WiFi network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 200, such as a touch-screen, keyboard, mouse, cursor-control device, touch-screen, microphone, digital camera, video recorder, or camcorder. The device inputs may be used to enter information and interact with the client device 200 and, by extension, with the systems described herein.

Client device 101 and/or application 102 require the capability of issuing data read commands for, and receiving, first type data and second type data. With respect to NDEF data (as the first type data) and EMV data (as the second type data), it should be noted that, presently, mobile devices (such as smartphones) running Google's Android® operating system are capable of handling both NDEF and EMV data (including issuing respective data read commands). While mobile devices (such as iPhones) running Apple's iOS® operating system are capable of handling NDEF data (including issuing NDEF data read commands), but not EMV data.

Figure 3:
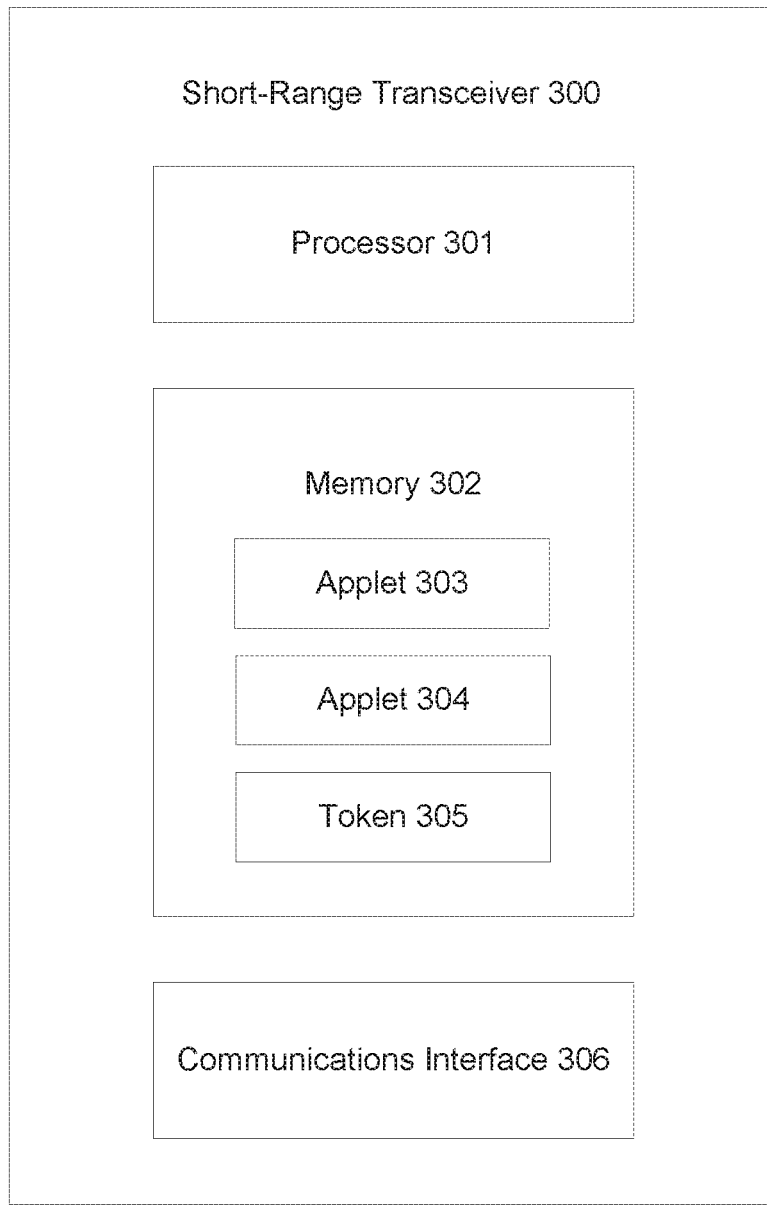
FIG. 3 illustrates components of a short-range transceiver used in a user verification system according to one or more example embodiments.

FIG. 3 illustrates components of a short-range transceiver 300 used in a user verification system according to one or more example embodiments. In one or more example embodiments, short-range transceiver 300 may be one or more of short-range transceiver 105, described above with reference to FIGS. 1A-1B. Short-range transceiver 300 may include, for example, a contactless card, a smart card, or may include a device with a varying form factor such as a fob, pendant or other device configured to communicate within a short-range communications field. Short-range transceiver 300 may include a processor 301, memory 302, applets 303-304, token 305 and short-range communications interface 306.

Processor 301 may include one or more processing devices such as a microprocessor, RISC processor, ASIC, etc., and may include associated processing circuitry. Processor 301 may include, or be connected to, memory storing executable instructions (such as, e.g., applet 303 and/or applet 304) and/or data, as may be necessary or appropriate to control, operate or interface with the other features of short-range transceiver 300. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory and/or read/write memory, e.g., RAM, ROM, and EEPROM.

Memory 302 may be configured to store applets 303-304 and one or more tokens 305. Applets 303-304 may comprise one or more software applications configured to execute on processor 301, such as a Java Card applet that may be executable on a contactless card. However, it is understood that applets 303-304 are not limited to Java Card applets, and instead may be any software application operable on contactless cards or other devices having limited memory. Applets 303 and/or 304 may be configured to respond to one or more requests (such as near field data exchange requests) from a client device, including requests from a device having a reader such as a mobile device NFC reader. Applets 303 and 304 may be configured to read (or write) data, including token 305, from (or to) memory 302 and provide such data in response to a request. Applet 303 may be configured to respond to NDEF read commands and provide data according to the NDEF format. Applet 304 may be configured to respond to EMV read commands and provide data according to the EMV format. In some embodiments, the functionality of applets 303 and 304 may be combined in a single applet.

Token 305 may include a unique alphanumeric identifier assigned to a user of the short-range transceiver 300, and the identifier may distinguish the user of the short-range transceiver 300 from other users of other short-range transceivers (such as other contactless card users). In some example embodiments, token 305 may identify both a user and an account assigned to that user and may further identify the short-range transceiver (such as a contactless card) associated with the user's account. In some example embodiments, token 305 may include a key unique to the user with which the short-range transceiver is associated.

Short-range communications interface 306 may support communication via a short-range wireless communication field, such as NFC, RFID, or Bluetooth. Short-range transceiver 300 may also include one or more antennas (not shown) connected to short-range communications interface 306 to provide connectivity with a short-range wireless communications field.

Figure 4:
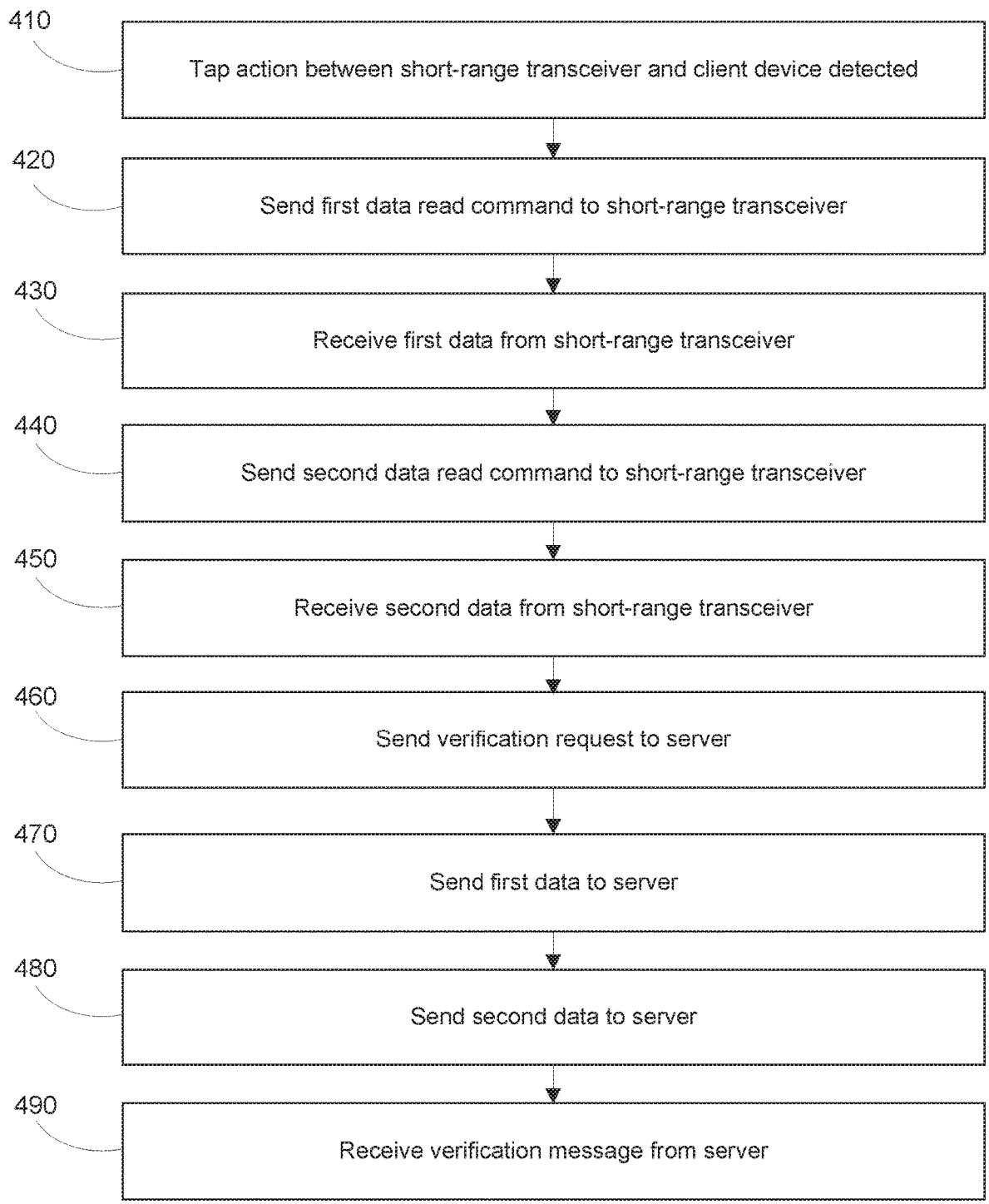
FIG. 4 provides a flowchart illustrating one or more methods of user verification according to one or more example embodiments.

FIG. 4 is a flowchart illustrating a method of user verification 400 according to one or more example embodiments, with reference to components and features described above, including but not limited to the figures and associated description. User verification method 400 may be carried out by application 102 executing on client device 101 associated with the user. Short-range transceiver 105 is associated with the user.

At block 410, a tap action may be detected between short-range transceiver 105 and client device 101. The tap action may be in response to a prompt displayed on client device 101. As described above, short-range transceiver 105 may be a contactless card.

At block 420, application 102 may send to short-range transceiver 105 a first data read command to read data of a first type. Sending the first data read command may occur after entry of short-range transceiver 105 into a short-range communication field of client device 101 such as, e.g., in response to the tap action of block 410. As described above, the first data read command may be a NDEF read command and the first type data may be NDEF data.

At block 430, first type data may be received from short-range transceiver 105. Receiving first type data may occur in response to sending the first data read command (block 420). The received first type data may include a first identifier. The first identifier may be associated with the user and/or with short-range transceiver 105. In some embodiments, the received first type data may include token 108. In some embodiments, token 108 may include a user key associated with the user. As described above, the first data read command may be a NDEF read command and the first type data may be NDEF data.

At block 440, application 102 may send to short-range transceiver 105 a second data read command to read data of a second type. Sending the second data read command may occur after entry of short-range transceiver 105 into a short-range communication field of client device 101 such as, e.g., in response to tap action of block 410. In some embodiments, sending the second data read command may occur in response to a second tap action (not shown) between short-range transceiver 105 and client device 101. The second tap action may be in response to a prompt displayed on client device 101. As described above, the second data read command may be an EMV read command and the second type data may be EMV data.

At block 450, second type data may be received from short-range transceiver 105. Receiving second type data may occur in response to sending the second data read command (block 440). The received second type data may include a second identifier. The second identifier may be associated with the user and/or with short-range transceiver 105. In some embodiments, the received second type data may include token 108. In some embodiments, token 108 may include a user key associated with the user. As described above, the second data read command may be an EMV read command and the second type data may be EMV data.

As described above, the order of read commands sent and type data transmitted/received is not critical. Thus, a command to read second type data (block 440) may precede a command to read first type data (block 420), and the receipt of second type data responsive to a command to read second type data (block 450) may precede the receipt of first type data responsive to a command to read first type data (block 430).

At block 460, a verification request may be transmitted to server 110, requesting verification of the user and/or the short-range transceiver associated with the user based on the first identifier and the second identifier. The verification request may be accompanied by, or precede or trail, transmission of the first type data (including the first identifier) and/or the second type data (including the second identifier).

At block 470, the first type data (including the first identifier) may be sent to server 110. As described above, the first type data may be NDEF data.

At block 480, the second type data (including the second identifier) may be sent to server 110. As described above, the second type data may be EMV data.

At block 490, a verification message may be received from server 110. The verification message may be based on the results of a verification process (such as the verification process described above with reference to label 174 of FIG. 1B). The verification message may confirm that the user and/or short-range transceiver 105 are verified. Based on the verification, the user may proceed to carry out further actions, such as, for example, a purchase, deposit or withdrawal transaction.

In some embodiments, a message (not shown) may be received from server 110 requesting that the user try again and/or try again with a different short-range transceiver (e.g., a different contactless card).

Figure 5A:
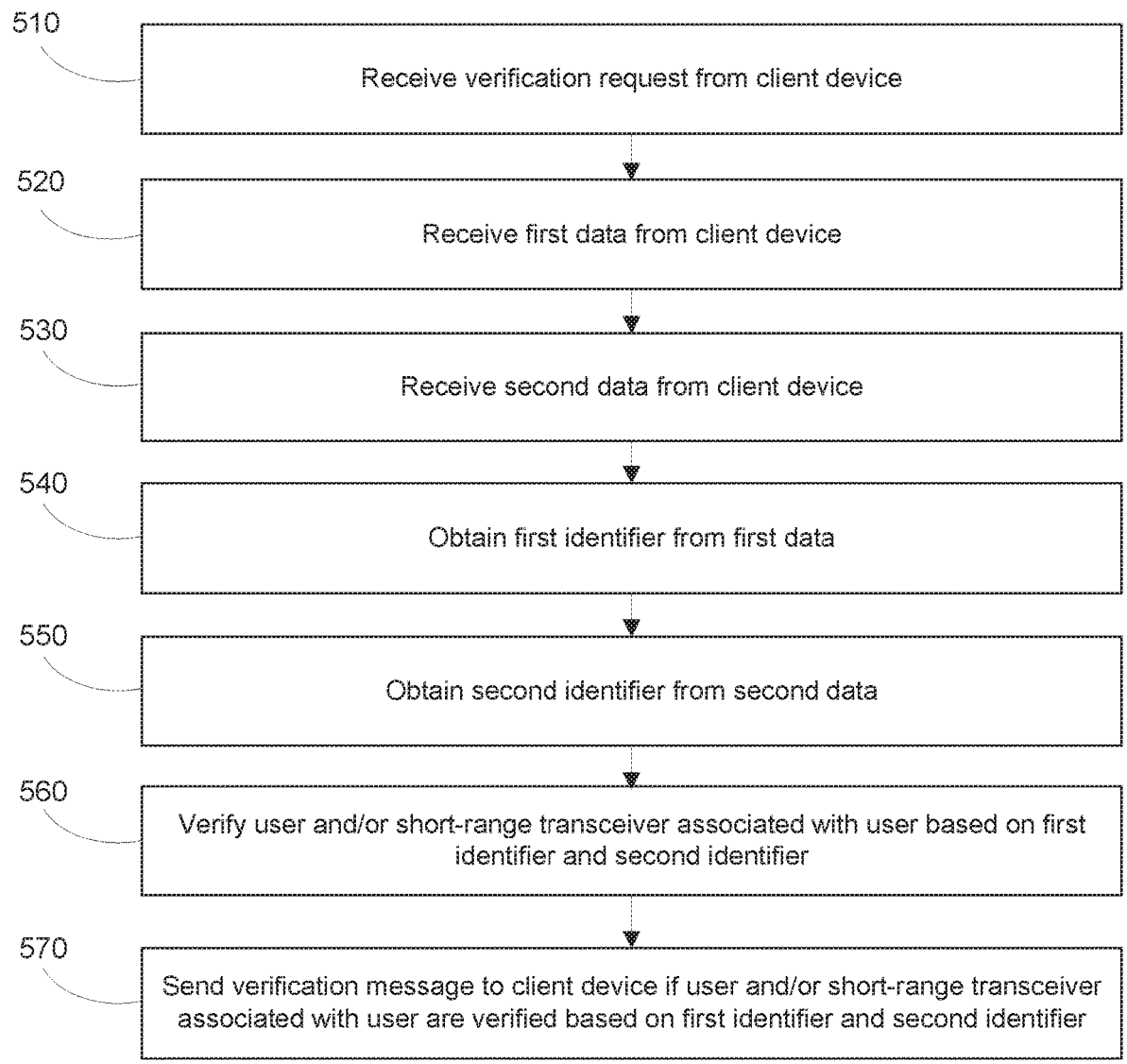
FIG. 5A provides a flowchart illustrating one or more methods of user verification according to one or more example embodiments.

FIG. 5A is a flowchart illustrating a method of user verification 500 according to one or more example embodiments, with reference to components and features described above, including but not limited to the figures and associated description. User verification method 500 may be carried out by processor 120 in communication with, via server 110, client device 101.

At block 510, a verification request may be received from client device 101, requesting verification of the user and/or the short-range transceiver associated with the user based on a first identifier and a second identifier. The verification request may be accompanied by, or precede or trail, receipt of first type data (including the first identifier) and/or second type data (including the second identifier). In some embodiments, the verification request received from client device 101 may be responsive to a verification request previously sent to client device 101 (as described above with reference to label 152 of FIG. 1B).

At block 520, first type data (including a first identifier) may be received from client device 101. As described above, the first type data may be NDEF data.

At block 530, second type data (including a second identifier) may be received from client device 101. As described above, the second type data may be EMV data.

At block 540, the first identifier may be obtained from the received first type data. As described above, if the first type data is NDEF data, the first identifier may be obtained by extracting the first identifier from the NDEF data.

At block 550, the second identifier may be obtained from the received second type data. As described above, if the second type data is EMV data, the second identifier may be obtained by extracting the second identifier from the EMV data.

At block 560, a verification process may be carried out. As described above with reference to label 174 of FIG. 1B, the verification process may include using the first identifier to look up user information in database 130 and using the second identifier to look up user information in database 130. The verification process may include comparing the user information obtained from the first identifier lookup to the user information obtained from the second identifier lookup to determine if the user information from each lookup corresponds to the same user. In some embodiments, the verification process may include comparing the user information obtained from the first identifier lookup to the user information obtained from the second identifier lookup to determine if the user information from each lookup corresponds to the same short-range transceiver associated with the user. In some embodiments, the verification process may include comparing the user information obtained from the first identifier lookup to the user information obtained from the second identifier lookup to determine if the user information from each lookup corresponds to the same user and the same short-range transceiver associated with the user.

At block 570, a verification message may be sent to client device 101. The verification message may be based on the results of a verification process (such as the verification process described above with reference to block 560). The verification message may confirm that the user and/or short-range transceiver 105 are verified.

In some embodiments, a message (not shown) may be sent to client device 101 requesting that the user try again and/or try again with a different short-range transceiver (e.g., a different contactless card).

Figure 5B:
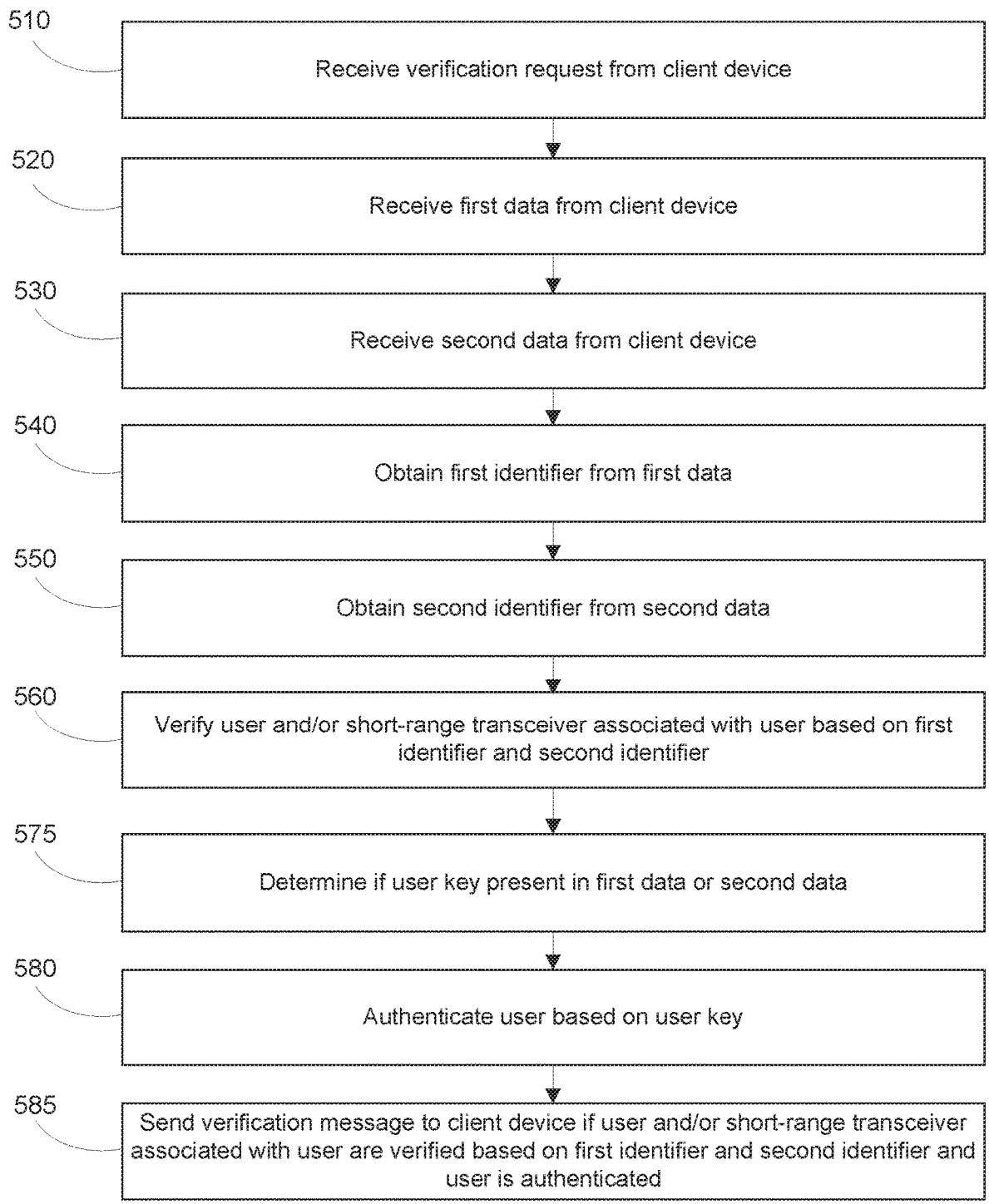
FIG. 5B provides a flowchart illustrating one or more methods of user verification according to one or more example embodiments.

FIG. 5B is a flowchart illustrating a method of user verification 501 according to one or more example embodiments, with reference to components and features described above, including but not limited to the figures and associated description. User verification method 501 may be carried out by processor 120 in communication with, via server 110, client device 101 associated with a user. Blocks 510 through 560 of method 501 include the same activity described above with reference to method 500 of FIG. 5A; method 501 then proceeds to block 575.

At block 575, it may be determined that a user key is present in the first type data or the second type data received from client device 101.

At block 580, the user may be authenticated based on the user key. As described above with reference to label 176 (FIG. 1B), database 130 may store a copy of the user key, or a key associated with the user that may be used to generate a copy of the user key. Generating a copy of the user key based on the key associated with the user may include using a counter or other data derived or otherwise maintained in synchronization between processor 120, client device 101 and/or short-range transceiver 105. The user may be authenticated, for example, if the user key received from client device 101 is matched to the user key obtained from, or generated from the key associated with the user and stored in, database 130. In some embodiments, the user may be authenticated, based on the user key received from client device 101, via other techniques.

At block 585, a verification message may be sent to client device 101. The verification message may be based on the results of the verification process described above with reference to block 560 and the user authentication process described above with reference to blocks 575-580. The verification message may confirm that the user and/or short-range transceiver 105 are verified. The verification may also confirm that the user has been authenticated.

In some embodiments, server 110 or client device 101 may send all or portions of the first type data, and/or all or portions of the second type data, to authorization network 140 as part of a transaction authorization process. For example, if the second type data is EMV data, server 110 or client device 101 may send all or portions of the EMV data, along with other data pertinent to a transaction, to authorization network 140. Authorization network 140 may process the data and reply with a transaction authorization message. If authorization network 140 authorizes the transaction, server 110 may use such authorization as a further indicia for verifying the user and/or short-range transceiver 105. In other embodiments, the authorization network 140 can be omitted from the transaction authorization process and the server 110 and/or client device 101 can perform this processing of the EMV data.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A two-form card verification system, comprising:
a database storing identification information for a plurality of contactless cards;
a client device configured to generate a short-range communication field;
a contactless card comprising a processor and a memory, the memory storing a first data corresponding to a first type, a second data corresponding to a second type, wherein the contactless card and the client device are associated with a same user; and
a server configured to communicate with the contactless card via the client device, and the database over a network;
wherein, after a first read of the contactless corresponding to a first entry motion of the contactless card into the short-range communication field of the client device, the contactless card is configured to transmit the first data to the client device and after a second read of the contactless card corresponding to a second entry motion of the contactless card into the short-range communication field of the client device, the contactless card is configured to transmit the second data, to the client device, wherein the client device is configured to distinguish the first entry motion of the contactless card into the short-range communication field from the second entry motion of the contactless card into the short-range communication field of the client device, and
wherein, after receipt of the first type data and the second type data, the server is configured to:
determine a first identifier based on the first type;
determine a second identifier based on the second type;
verify at least one of the user or the contactless card based on the first identifier and the second identifier; and
transmit a verification message, wherein the verification message corresponds to a message indicating that the contactless card and the user have not been successfully verified or a message indicating that the contactless card has been successfully verified.

2. The two-form card verification system of claim 1, wherein the short-range communication field comprises near field communication (NFC).

3. The two-form card verification system of claim 2, wherein the first type comprises NFC data exchange format data.

4. The two-form card verification system of claim 3, wherein the second type comprises Europay Mastercard Visa (EMV) data.

5. The two-form card verification system of claim 1, wherein the client device is associated with a point of sale (POS) system.

6. The two-form card verification system of claim 1, wherein the client device stores a client application comprising instructions for execution by the client device.

7. The two-form card verification system of claim 6, wherein the client application is further configured to transmit the second data corresponding to the second type to a card authorization network.

8. The two-form card verification system of claim 1, wherein a transmission of the verification message by the server is based on determining that both of the first identifier and the second identifier correspond to the contactless card associated with the user.

9. The two-form card verification system of claim 1, wherein a transmission of the verification message by the server is based on determining that both of the first identifier and the second identifier correspond to the user of the contactless card.

10. The two-form card verification system of claim 1 wherein a transmission of the verification message by the server is based on determining that the first identifier and the second identifier respectively correspond to the user of the contactless card and the contactless card.

11. The two-form card verification system of claim 1, wherein a verification of the at least one of the user or the contactless card comprises using the first identifier to look up a first user identification information from the database and the second identifier to look up a second user identification information from the database.

12. A method for two-form card verification, comprising:
    establishing a database storing user identifier information for a plurality of contactless cards;
    receiving, by a server, a card verification request to verify a contactless card associated with a user, the card verification request being transmitted by a client device in short-range communication with the contactless card, the client device being associated with the user, wherein the card verification request is accompanied by a first type data read from the contactless card in response to a first entry motion of the contactless card into a short-range communication field of the client device and by a second type data read from the contactless card in response to a second entry motion of the contactless card into the short-range communication field of the client device, wherein the client device is configured to distinguish the first entry motion of the contactless card from the second entry motion of the contactless card;
    determining a first identifier based on the first type data;
    determining a second identifier based on the second type data;
    verifying one or both of the user and the contactless card based on the first identifier and the second identifier; and
    transmitting, by the server, a verification message to the client device, wherein the verification message corresponds to one of a message indicating that the contactless card has not been successfully verified and a message indicating that the contactless card has been successfully verified.

13. The method of claim 12, wherein determining the first identifier based on the first type data, read during the first entry of the contactless card into the short-range communication field of the client device, comprises searching the database using at least a portion of the first type data.

14. The method of claim 12, wherein determining the second identifier based on the second type data, read during the second entry of the contactless card into the short-range communication field of the client device, comprises searching the database using at least a portion of the second type data.

15. The method of claim 12, wherein the short-range communication field comprises near field communication (NFC).

16. The method of claim 15, wherein the first type data comprises NFC data exchange format data and wherein the second type data comprises Europay Mastercard Visa (EMV) data.

17. The method of claim 16, further comprising transmitting the second type data to a card authorization network.

18. The method of claim 17, further comprising receiving a transaction authorization response from the card authorization network.

19. The method for two-form card verification of claim 12, wherein the transmitting of the verification message by the server is based on determining that both of the first identifier and the second identifier correspond to the contactless card associated with the user.

20. A non-transitory computer-accessible medium having stored thereon computer-executable instructions for providing encrypted user information, wherein, when a computer arrangement executes the instructions, the computer arrangement is configured to perform procedures comprising:
    establishing a database storing user identifier information for a plurality of contactless cards;
    receiving, by a server, a card verification request to verify a contactless card associated with a user, the card verification request being transmitted by a client device in short-range communication with the contactless card, the client device being associated with the user, wherein the card verification request is accompanied by a first type data read from the contactless card in response to a first entry motion of the contactless card into a short-range communication field of the client device and by a second type data read from the contactless card in response to a second entry motion of the contactless card into the short-range communication field of the client device, wherein the client device is configured to distinguish the first entry motion of the contactless card from the second entry motion of the contactless card;
    determining a first identifier based on the first type data;
    determining a second identifier based on the second type data;
    verifying one or both of the user and the contactless card based on the first identifier and the second identifier; and
    transmitting, by the server, a verification message to the client device, wherein the verification message corresponds to one of a message indicating that the contactless card has not been successfully verified and a message indicating that the contactless card has been successfully verified.

* * * * *

UNITED STATES PATENT AND TRADEMARK OFFICE
CERTIFICATE OF CORRECTION

PATENT NO. : 12,165,149 B2  
APPLICATION NO. : 16/991504  
DATED : December 10, 2024  
INVENTOR(S) : Samuel Patrick Edwards, Lesley Newton and Clayton Johnson Page 1 of 1

It is certified that error appears in the above-identified patent and that said Letters Patent is hereby corrected as shown below:

In the Claims

In Claim 1 at Column 18, Line 23, change:  
"less card is configured to transmit the second data, to"  
To:  
-- less card is configured to transmit the second data to --.

Signed and Sealed this  
Fourth Day of February, 2025

Coke Morgan Stewart  
*Acting Director of the United States Patent and Trademark Office*